June 18, 1957     L. K. WATSON     2,796,269
WEIGHT ASSEMBLY AND LOCKING CLUTCH COLLAR Filed March 1, 1956

*INVENTOR.*
Lester K. Watson
BY
Attorney

United States Patent Office 2,796,269
Patented June 18, 1957

2,796,269

WEIGHT ASSEMBLY AND LOCKING CLUTCH COLLAR

Lester K. Watson, York, Pa.

Application March 1, 1956, Serial No. 568,792

2 Claims. (Cl. 287—52.09)

This invention relates to a weight assembly and a locking clutch collar therefor and, more particularly, to a locking clutch collar which is operable automatically for free axial movement in one direction along a shaft but constructed to prevent free axial movement thereof in an opposite direction unless said collar simultaneously is rotated in one axial direction.

The present invention primarily is adapted for holding disc-like weights for example assembled upon a shaft for purposes of providing an exercising device of the type used by weight-lifters and the like. One commercial product of this nature is sold under the trade name "Bar Bell." Devices of this nature usually comprise an elongated cylindrical shaft having either fixed or adjustable collars thereon and as many disc-like weights as are desired are placed upon said shaft from opposite ends thereof and into abutment with said collars. Then, to prevent accidental or unintended removal of the disc-like weights from the shaft, still further locking or clamping collars must be placed upon the shaft from opposite ends thereof and moved inwardly in an axial direction against the outermost weights on the shaft. At present, the locking or clamping collars mounted upon the shaft and engaging the outermost weights are locked relative to the shaft by means such as set screws which are undesirable in that not only must a wrench or pair of pliers be on hand to lock as well as remove said collars, but the inner end of such set screws mar the outer surface of the shaft.

It is the principal object of the present invention to overcome this inherent difficulty commonly experienced in weight devices of the type described by providing automatically operable locking means in locking or clamping clutch collars of the type referred to, the details of said clamping collars permitting free axial movement thereof onto the shaft in one direction and also automatically lock the collar against axial movement in the opposite or removal direction except by simultaneously rotating the collar relative to the shaft in one rotary direction.

Another object of the invention is to provide such a locking clutch collar which is simple and relatively inexpensive to construct and easy to assemble to produce an automatically operable clutch collar which is durable and capable of long life, as well as being fool-proof in action.

Details of the foregoing objects and the invention, as well as other objects thereof, are set forth in the following specification and illustrated in the accompanying drawing comprising a part thereof.

Figure 1:
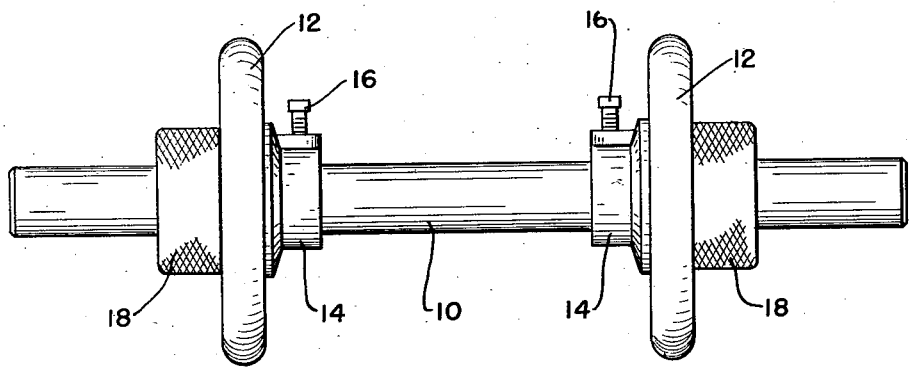
Fig. 1 is a side elevation of an exemplary exercising weight assembly illustrating a shaft upon which a pair of disc-like weight members are assembled and held thereon by a pair of clutch collars embodying the principles of the present invention.

Referring to Fig. 1, it will be seen that an exemplary type of weight assembly comprising an exercising device includes an elongated cylindrical shaft 10 upon which a pair of preferably centrally apertured disc-like weight members 12 have been assembled. Either fixed or adjustable positioning collars 14 of a conventional type as presently used are disposed upon shaft 10 and held in a desired position thereon by conventional means such as set screws 16. At present, collars similar to positioning collars 14 are used to hold the weight members 12 against removal from the outer ends of the shaft 10, whereby a set of four of such collars 14 are commonly used at present on a single exercising device of the type described. However, it is necessary to have either a wrench, pliers, or the like to operate the set screws 16 and, further, the inner ends of the set screws mar the outer surface of the shaft 10.

In accordance with the present invention, a pair of clutch collars 18, embodying the principles of the present invention, are shown mounted upon opposite end portions of shaft 10 and substantially in abutment with the weight members 12 as shown in Fig. 1. Details of the preferred construction of said clutch collars are shown in Figs. 2 through 4.

Figure 2:
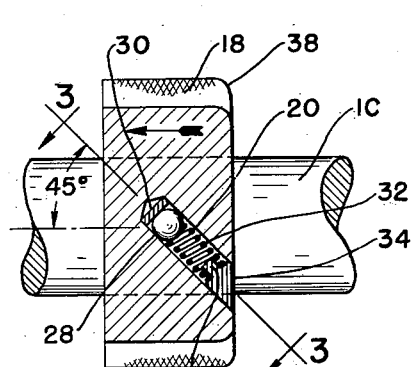
Fig. 2 is a sectional view taken on a plane parallel to the shaft axis but intersecting the clutch collar along the line 2—2 of Fig. 3.

Each of these clutch collars is provided with an elongated, preferably cylindrical, recess 20 which extends from the outer face 22 of collar 18 inwardly at an angle of substantially 45° to the axis of shaft 10 as clearly seen in Fig. 2. The axis of the recess 20 extends along the line 3—3 of Fig. 2 and the inner end of recess 20 extends a little past the middle of the collar 18 between the opposite faces thereof.

Figure 3:
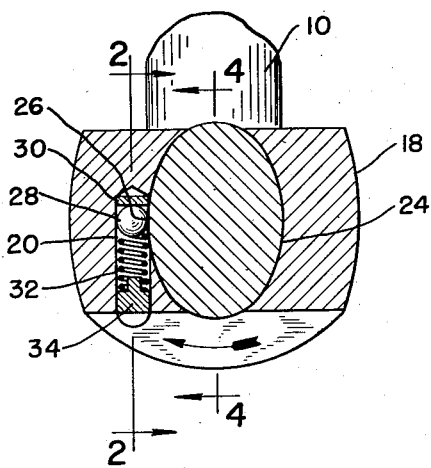
Fig. 3 is a sectional view taken on the line 3—3 of Fig. 2.
Figure 4:
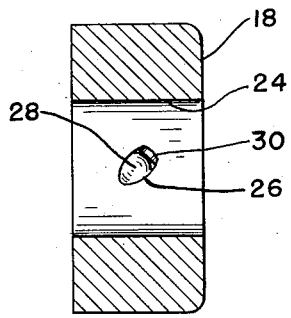
Fig. 4 is a sectional view of the clutch per se taken on the line 4—4 of Fig. 3.

Referring now to Fig. 3, which is a sectional view taken on the line 3—3 of Fig. 2, it will be seen that the elongated recess 20 is disposed within a plane parallel to the axis of shaft 10 but spaced therefrom a suitable distance so that the inner end portion of the recess 20 slightly breaks through the wall of the central cylindrical opening 24 in the collar 18, said opening receiving the shaft 10. The so-called "break-through" opening 26 preferably is less wide than the diameter of the recess 20.

In the preferred construction of the invention, it has been found that a satisfactory difference in diameter between the diameter of opening 24 and the outer diameter of shaft 10 should be of the order of between .002 inch and .005 inch. This has been found to be suitable for permitting free axial movement of the clutch 18 relative to the shaft 10, yet not permit any appreciable and undesirable play between the same. This specified difference in diameters is not to be regarded as restrictive, however.

A locking ball 28 is disposed within the elongated recess 20 adjacent the innermost end thereof. The ball 28 is prevented from being disposed within the innermost end of the recess 20 by a stop disc 30 being inserted in the innermost end of the recess 20. The diameter of ball 28 preferably is only slightly less than that of recess 20, whereby the ball by no means frictionally engages the walls of the recess 20. Further, the relative position of the stop disc 30 to the "break-through" opening 26 and the diameter of ball 28 are such that the ball is opposite said opening 26 and actually will partially project through said opening a distance within the range of between .020 inch and .025 inch. Such projection of the ball also is provided due to the distance between the longitudinal axes of the recess 20 and the opening 24 through the collar 14, in relation to the diameter of the ball 28 and the difference in diameter between the ball 28 and the recess 20. That is, when the ball is in engagement with the surface of the recess 20 opposite opening 26, said ball preferably will project beyond the surface defining the central opening 24 in the collar a distance of the order given above.

Also disposed within the recess 20 is a resilient compression member in the specific form of a coil compression spring 32, the inner end of which abuts the locking ball 28 and constantly urges the same against the stop disc 30. Such spring may be held within the recess 20 by any suitable means such as a plug 34 which may be assembled relative to the collar 18 very inexpensively by using a driving fit between the plug and the walls of recess 20. A suitable jig or fixture may be utilized to insure that the plug 34 may be driven into the outer end of the recess 20 a desired distance so as to place the compression member 32 under desired compression.

Centering the outer end of spring compression member 32 may be facilitated by forming a suitable extension 36 which is received within the outer end of compression member 32.

The outer end of the plug 34 preferably is ground off or otherwise finished so that the outer end is flush with the outer face 22 of collar 18. Such arrangement contributes to the esthetic appearance of the clutch collar 18. In addition, manipulation of the collar may be facilitated by externally knurling at least the outer cylindrical surface of the collar 18 as indicated in Fig. 1.

Due primarily to the angular arrangement of the recess 20 relative to the axis of shaft 10 as shown in Fig. 2, the collar 18 may be moved axially along shaft 10 freely in the direction of the arrow shown in Fig. 2. However, the clutch may not be moved in the opposite axial direction since the ball 28 may move further into the recess 20 and bind between the outer surface of shaft 10 and the wall of recess 20 opposite the break-through opening 26. Further, when the clutch collar 18 is positioned operatively upon shaft 10, the ball 28 will not be in abutting position against the stop disc 30 as shown in Figs. 2 and 3 but will at least be slightly spaced therefrom. However, the principal function of the stop disc 30 will be to prevent the locking ball 28 from becoming seated too firmly in the conventional conical inner end of the recess 20 which usually is formed by drilling with a twist drill.

When it is desired however to remove the locking clutch collars 18 from opposite ends of the shaft 10, it is only necessary to rotate the collar relative to shaft 10 in the direction of the curved arrow shown in Fig. 3 while simultaneously pulling the collar toward the free end of the shaft 10. Such movement tends to move the locking ball 28 away from the stop disc 30 so that the ball will no longer be wedged between the outer surface of shaft 10 and the inner surface of recess 20 opposite the break-through opening 26.

Further, by arranging the axis of recess 20 substantially at 45° to the axis of shaft 10, as shown in Fig. 2, rapid movement of the collar 18 onto shaft 10 to desired position is facilitated. Also, by disposing the axis of recess 20 in a plane which is parallel to another plane axially bisecting the collar 18, as shown in Fig. 3, rapid removal of the clutch collar 18 from the outer end of shaft 10 may be effected.

In order that the normal outer end of the clutch collar may readily be determined, the same may be finished with a rounded outer corner 38. This also enhances the appearance of the collar. Further, the outer cylindrical surface of each collar may be knurled to not only render it more attractive but also enhance gripping the same to mount it upon shaft 10 and remove it therefrom.

From the foregoing, it will be seen that the present invention provides an effective weight assembly upon which one or more weights readily may be assembled as desired upon the supporting shaft and held in operative position upon said shaft by esthetically attractive and mechanically advantageous, automatically operable clutch collars which may be installed upon the shaft simply by moving the same directly and axially inwardly upon the shaft from opposite ends thereof and into abutment with the disc weights. Such movement in no way mars the outer surface of the shaft. When however it is desired to remove the clutch collars from the shaft, it is only necessary to rotate said collars in one rotary direction upon the shaft while pulling the collar axially toward the outer end of the shaft. Such removal operation leaves no mars or adverse effects upon either the clutch members or the shaft. No tools are required to operate the clutch collars and, when removed from the shaft, said collars are at all times in position to be readily and quickly mounted upon the shaft.

Further, by providing the rounded outer corners 38, the same serves as an indication that said rounded end is the outer end of each clutch collar, whereby accidental placement of the clutch collars upon the improper end of the shaft may be obviated. Also, if desired, two pairs of such clutch collars may be used in any single assembly of weights upon a shaft, the clutch collars embodying the principles of the present invention serving in lieu of the conventional positioning collars such as collars 14 shown in Fig. 1.

While the invention has been shown and illustrated in its preferred embodiment, and has included certain details, it should be understood that the invention is not to be limited to the precise details herein illustrated and described since the same may be carried out in other ways falling within the scope of the invention as claimed.

I claim:

1. A clutch collar having a cylindrical opening therethrough to receive a shaft and secure objects against unintended removal from said shaft, said collar having an elongated internal recess therein, the axis of said recess as viewed in side elevation of said clutch extending at an angle of approximately 45° to the axis of said shaft receiving opening and the axis of said recess when viewed from one end of said clutch being substantially parallel to a plane intersecting said collar axially, a locking ball disposed within and movable longitudinally of said internal recess adjacent one end thereof, said end of said recess extending partially through the wall defining the opening through said collar, whereby only a portion of said ball projects through said open inner end of said internal recess to engage a shaft extending through said clutch opening, and means urging said ball constantly toward said open inner end of said internal recess, said ball serving to lock said clutch against axial movement in one direction from a shaft extending through the opening therein and permit withdrawal of said clutch from said shaft in the opposite axial direction while rotating said clutch in one rotary direction.

2. A clutch collar having a cylindrical opening therethrough to receive a shaft and secure objects against unintended removal from said shaft, said opening being of the order of between .002" and .005" greater in diameter than the outer diameter of said shaft and said collar having an elongated internal recess therein, the axis of said recess as viewed in side elevation of said clutch extending at an angle of approximately 45° to the axis of said shaft receiving opening and the axis of said recess when viewed from one end of said clutch being substantially parallel to a plane intersecting said collar axially, a locking ball disposed within and movable longitudinally of said internal recess adjacent one end thereof, said end of said recess extending partially through the wall defining the opening through said collar, whereby only a portion of said ball projects through said open inner end of said internal recess when disengaged from a shaft a distance substantially of the order of between .020" and .025", thereby being engageable with a shaft when extending through said clutch opening, a compression spring urging said ball constantly toward said open inner end of said internal recess, and a plug extending into said recess from the outer surface of said clutch and engaging said spring to hold it compressed against said ball, said ball serving to lock said clutch against axial movement in one direction from a shaft extending through the opening therein and permit withdrawal of said clutch from said shaft in the opposite axial direction while rotating said clutch in one rotary direction.

References Cited in the file of this patent

UNITED STATES PATENTS

| | | |
|---|---|---|
| 2,244,351 | Venables | June 3, 1941 |
| 2,488,461 | Wysocki | Nov. 15, 1949 |
| 2,497,550 | Jeffries | Feb. 14, 1950 |
| 2,516,428 | Scott | July 25, 1950 |
| 2,599,003 | Leonard | June 3, 1952 |
| 2,640,696 | Lemieux | June 2, 1953 |
| 2,665,950 | Johnson | Jan. 12, 1954 |
| 2,697,016 | Spurgeon | Dec. 14, 1954 |

FOREIGN PATENTS

| | | |
|---|---|---|
| 843,630 | Germany | Dec. 14, 1950 |